(12) United States Patent
Miyamoto et al.

(10) Patent No.: US 11,993,180 B2
(45) Date of Patent: May 28, 2024

(54) IN-VEHICLE SOLAR CHARGE CONTROL SYSTEM, IN-VEHICLE SOLAR CHARGE CONTROL METHOD, AND PROGRAM

(71) Applicant: TOYOTA JIDOSHA KABUSHIKI KAISHA, Toyota (JP)

(72) Inventors: Yuma Miyamoto, Toyota (JP); Kohki Ohkoshi, Nagoya (JP); Masahiro Takahashi, Toyota (JP); Akinori Kawamura, Okazaki (JP); Taisuke Hayashi, Miyoshi (JP); Takashi Fukai, Oobu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 402 days.

(21) Appl. No.: 17/644,863

(22) Filed: Dec. 17, 2021

(65) Prior Publication Data

US 2022/0258615 A1    Aug. 18, 2022

(30) Foreign Application Priority Data

Feb. 16, 2021    (JP) .................................. 2021-022832

(51) Int. Cl.
*B60L 8/00*    (2006.01)
*B60L 53/20*    (2019.01)
*B60L 53/62*    (2019.01)
*B60L 58/20*    (2019.01)

(52) U.S. Cl.
CPC .............. *B60L 8/003* (2013.01); *B60L 53/20* (2019.02); *B60L 53/62* (2019.02); *B60L 58/20* (2019.02); *B60L 2210/10* (2013.01)

(58) Field of Classification Search
CPC ......................................................... B60L 8/003
USPC ............................................................. 320/101
See application file for complete search history.

(56) References Cited

U.S. PATENT DOCUMENTS

| | | | | |
|---|---|---|---|---|
| 2009/0001926 A1* | 1/2009 | Sato | ....................... | B60L 3/003 320/102 |
| 2009/0289594 A1* | 11/2009 | Sato | ....................... | H02J 7/35 320/101 |
| 2010/0000804 A1* | 1/2010 | Yeh | ....................... | B60L 1/006 180/2.2 |
| 2011/0187184 A1* | 8/2011 | Ichikawa | ................ | B60L 55/00 307/10.1 |
| 2012/0136534 A1* | 5/2012 | Walsh | ................. | H01M 10/465 701/36 |

(Continued)

FOREIGN PATENT DOCUMENTS

JP     2019-126219 A    7/2019

*Primary Examiner* — Jerry D Robbins
(74) *Attorney, Agent, or Firm* — Oblon, McClelland, Maier & Neustadt, L.L.P.

(57) ABSTRACT

An in-vehicle solar charge control system includes a path switching unit provided in parallel with the first DC-to-DC converter on an electrical circuit that connects a solar DC-to-DC converter and a first battery and through which electricity having output power flows, and a switching unit controller which switches the path switching unit between a first state in which the output power is supplied to the first battery without being input to the first DC-to-DC converter, and a second state in which the output power is allowed to be input to the first DC-to-DC converter that is switched to the first operating state by a converter control unit.

6 Claims, 5 Drawing Sheets

(56) References Cited

U.S. PATENT DOCUMENTS

| | | | | |
|---|---|---|---|---|
| 2012/0286052 | A1* | 11/2012 | Atluri | B60L 8/003 |
| | | | | 180/65.265 |
| 2014/0159478 | A1* | 6/2014 | Ang | B60L 1/003 |
| | | | | 307/9.1 |
| 2015/0280487 | A1* | 10/2015 | Nakazawa | B60L 58/20 |
| | | | | 320/101 |
| 2015/0291052 | A1* | 10/2015 | Nakazawa | B60R 16/03 |
| | | | | 320/101 |
| 2016/0075243 | A1* | 3/2016 | Okumura | H02J 7/16 |
| | | | | 318/139 |
| 2016/0089986 | A1* | 3/2016 | Maeno | B60L 58/12 |
| | | | | 320/101 |
| 2017/0166079 | A1* | 6/2017 | Saucke | H02J 7/35 |
| 2018/0043788 | A1* | 2/2018 | Kuribara | B60L 8/003 |
| 2018/0099577 | A1* | 4/2018 | Nagata | B60L 58/24 |
| 2018/0105042 | A1* | 4/2018 | Kuribara | B60L 58/10 |
| 2018/0154778 | A1* | 6/2018 | Ota | H02J 7/0068 |
| 2018/0251034 | A1* | 9/2018 | Lee | H02J 7/35 |
| 2018/0358832 | A1* | 12/2018 | Son | B60L 8/003 |
| 2020/0247258 | A1* | 8/2020 | Park | B60L 53/51 |
| 2021/0078428 | A1* | 3/2021 | Jung | B60L 53/60 |

* cited by examiner

IN-VEHICLE SOLAR CHARGE CONTROL SYSTEM, IN-VEHICLE SOLAR CHARGE CONTROL METHOD, AND PROGRAM

CROSS-REFERENCE TO RELATED APPLICATION

This application claims priority to Japanese Patent Application No. 2021-022832 filed on Feb. 16, 2021, incorporated herein by reference in its entirety.

BACKGROUND

1. Technical Field

The present disclosure relates to an in-vehicle solar charge control system, an in-vehicle solar charge control method, and a program.

2. Description of Related Art

Japanese Unexamined Patent Application Publication No. 2019-126219 discloses an in-vehicle solar charge control system that supplies power generated by a solar panel to a battery via two DC-to-DC converters.

SUMMARY

The electric power generated by the solar panel of the in-vehicle solar charge control system of JP 2019-126219 A is always supplied to the battery via two DC-to-DC converters. Consequently, the in-vehicle solar charge control system of JP 2019-126219 A loses a large amount of power due to the DC-to-DC converters.

In consideration of such facts, the present disclosure is intended to provide an in-vehicle solar charge control system in which two DC-to-DC converters are provided between the solar panel and the battery while power loss due to the DC-to-DC converters can be limited, an in-vehicle solar charge control method, and a program.

An in-vehicle solar charge control system according to a first aspect of the present disclosure is a system including a solar panel mounted on a vehicle, a solar DC-to-DC converter to which power generated by the solar panel is input, a first DC-to-DC converter to which output power output by the solar DC-to-DC converter is to be input, a converter control unit configured to switch the first DC-to-DC converter between a first operating state in which power is output while lowering a voltage when the output power is input, and a first stopped state in which power is not output, a first battery which is chargeable with power output by the first DC-to-DC converter in the first operating state, a path switching unit provided in parallel with the first DC-to-DC converter on an electrical circuit that connects the solar DC-to-DC converter and the first battery and through which electricity having the output power flows, and a switching unit controller which switches the path switching unit between a first state in which the output power is supplied to the first battery without being input to the first DC-to-DC converter, and a second state in which the output power is allowed to be input to the first DC-to-DC converter that is switched to the first operating state by the converter control unit.

In the above configuration, the in-vehicle solar charge control system includes the solar panel mounted on the vehicle, the solar DC-to-DC converter to which power generated by the solar panel is input, and the first DC-to-DC converter to which the output power output by the solar DC-to-DC converter is to be input. The in-vehicle solar charge control system further includes the converter control unit configured to switch the first DC-to-DC converter between the first operating state in which the power is output while lowering the voltage when the output power is input and the first stopped state in which the power is not output, and the first battery which is chargeable with the power output by the first DC-to-DC converter in the first operating state.

Further, the in-vehicle solar charge control system also includes the path switching unit provided in parallel with the first DC-to-DC converter on an electrical circuit that connects the solar DC-to-DC converter and the first battery and through which electricity having the output power flows. The switching unit controller switches the path switching unit between the first state in which the output power is supplied to the first battery without being input to the first DC-to-DC converter, and the second state in which the output power is allowed to be input to the first DC-to-DC converter that is switched to the first operating state by the converter control unit.

In a case where the first DC-to-DC converter is in the first stopped state and the path switching unit is in the first state, the power generated by the solar panel is output from the solar DC-to-DC converter and then supplied to the first battery not via the first DC-to-DC converter. Therefore, the in-vehicle solar charge control system according to the first aspect is capable of achieving a configuration in which two DC-to-DC converters are provided between the solar panel and the first battery while power loss due to the DC-to-DC converters can be limited.

In the first aspect, the in-vehicle solar charge control system may further include an electric energy acquisition unit configured to acquire electric energy of the output power. The switching unit controller may switch the path switching unit to the first state and the converter control unit may switch the first DC-to-DC converter to the first stopped state, when the electric energy of the output power acquired by the electric energy acquisition unit is equal to or lower than a threshold.

In the above configuration, when the electric energy of the output power acquired by the electric energy acquisition unit is equal to or lower than the threshold, the switching unit controller switches the path switching unit to the first state and the converter control unit switches the first DC-to-DC converter to the first stopped state. Therefore, when the electric energy of the output power is equal to or lower than the threshold, the generated power is supplied only to the first battery.

In the first aspect, the in-vehicle solar charge control system may further include a required electric energy acquisition unit configured to acquire required electric energy of the first battery as the threshold, and a comparison unit configured to compare the electric energy of the output power acquired by the electric energy acquisition unit with the required electric energy acquired by the required electric energy acquisition unit. The first battery may not be overcharged when power equal to or less than the required electric energy is supplied to the first battery, and the switching unit controller may switch the path switching unit to the second state and the converter control unit may switch the first DC-to-DC converter to the first operating state, when the comparison unit determines the electric energy of the output power is greater than the required electric energy.

In the above configuration, when the comparison unit determines the electric energy of the output power is greater than the required electric energy, the switching unit controller switches the path switching unit to the second state and the converter control unit switches the first DC-to-DC converter to the first operating state. Meanwhile, in a case where the electric energy of the output power is equal to or less than the required electric energy, the switching unit controller switches the path switching unit to the first state and the converter control unit switches the first DC-to-DC converter to the first stopped state. Consequently, the power having electric energy equal to or less than the required electric energy is supplied to the first battery. Therefore, the first battery is not overcharged.

In the first aspect, the in-vehicle solar charge control system may further include a second DC-to-DC converter to which the output power is to be input, the second DC-to-DC converter being switched by the converter control unit between a second operating state in which power is output while increasing a voltage when the output power is input and a second stopped state in which power is not output, a second battery which is charged by power output by the second DC-to-DC converter in the second operating state, and at least one auxiliary machine which is supplied with power from the first battery. The second DC-to-DC converter that is switched to the second operating state by the converter control unit may output, when a predetermined condition that the vehicle is stopped and a power generation amount of the output power is greater than the required electric energy is satisfied, to the second battery, power of surplus electric energy obtained by subtracting the required electric energy from the electric energy of the output power. The converter control unit may switch the first DC-to-DC converter to the first stopped state and the second DC-to-DC converter to the second stopped state and the switching unit controller may switch the path switching unit to the first state, when the predetermined condition is not satisfied.

In the above configuration, in a case where the predetermined condition that the vehicle is stopped and the power generation amount of the output power is greater than the required electric energy is satisfied, the second DC-to-DC converter that is switched to the second operating state by the converter control unit outputs, to the second battery, the power of surplus electric energy obtained by subtracting the required electric energy from the electric energy of the output power. Further, the switching unit controller switches the path switching unit to the second state and the converter control unit switches the first DC-to-DC converter to the first operating state. Therefore, when the predetermined condition is satisfied, the power of the required electric energy or less is supplied to the first battery, and the power of the surplus electric energy can be stored in the second battery.

In the above configuration, the converter control unit switches the first DC-to-DC converter to the first stopped state and the second DC-to-DC converter to the second stopped state and the switching unit controller switches the path switching unit to the first state, when the predetermined condition is not satisfied. Consequently, in a case where the vehicle is in a traveling state, the power having the electric energy exceeding the required electric energy is supplied to the first battery. When the vehicle is in the traveling state, the power consumption of the auxiliary machine supplied with the power from the first battery is likely to be larger than when the vehicle is in a stopped state. With this configuration, even if the power having electric energy exceeding the required electric energy is supplied to the first battery, it is unlikely that the first battery is overcharged.

An in-vehicle solar charge control method according to a second aspect of the present disclosure is executed by an in-vehicle solar charge control system. The in-vehicle solar charge control system includes a solar panel mounted on a vehicle, a solar DC-to-DC converter to which power generated by the solar panel is input, a first DC-to-DC converter which is switched between a first operating state in which power is output while lowering a voltage when output power generated by the solar DC-to-DC converter is input, and a first stopped state in which power is not output, a first battery which is chargeable with power output by the first DC-to-DC converter in the first operating state, and a path switching unit provided in parallel with the first DC-to-DC converter on an electrical circuit that connects the solar DC-to-DC converter and the first battery and through which electricity having the output power flows, the path switching unit switching between a first state in which the output power is supplied to the first battery without being input to the first DC-to-DC converter, and a second state in which the output power is allowed to be input to the first DC-to-DC converter in the first operating state. The method includes a step of determining whether electric energy of the output power is equal to or lower than a threshold, and a step of switching the path switching unit to the first state and switching the first DC-to-DC converter to the first stopped state, in a case where the electric energy of the output power is equal to or lower than the threshold.

A program according to a third aspect of the present disclosure is used for an in-vehicle solar charge control system. The in-vehicle solar charge control system includes a solar panel mounted on a vehicle, a solar DC-to-DC converter to which power generated by the solar panel is input, a first DC-to-DC converter which is switched between a first operating state in which power is output while lowering a voltage when output power generated by the solar DC-to-DC converter is input, and a first stopped state in which power is not output, a first battery which is chargeable with power output by the first DC-to-DC converter in the first operating state, and a path switching unit provided in parallel with the first DC-to-DC converter on an electrical circuit that connects the solar DC-to-DC converter and the first battery and through which electricity having the output power flows, the path switching unit switching between a first state in which the output power is supplied to the first battery without being input to the first DC-to-DC converter, and a second state in which the output power is allowed to be input to the first DC-to-DC converter in the first operating state. The program causes the system to execute determining whether electric energy of the output power is equal to or lower than a threshold, and switching the path switching unit to the first state and switching the first DC-to-DC converter to the first stopped state, when the electric energy of the output power is equal to or lower than the threshold.

As described above, the in-vehicle solar charge control system, the in-vehicle solar charge control method, and the program according to each aspect of the present disclosure has advantageous effects of limiting power loss due to the DC-to-DC converters with a configuration in which two DC-to-DC converters are provided between the solar panel and the battery.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments of an in-vehicle solar charge control system 10 (hereinafter simply referred to a system 10), an in-vehicle solar charge control method, and a program, according to the present disclosure, will be described referring to the drawings.

Figure 1:
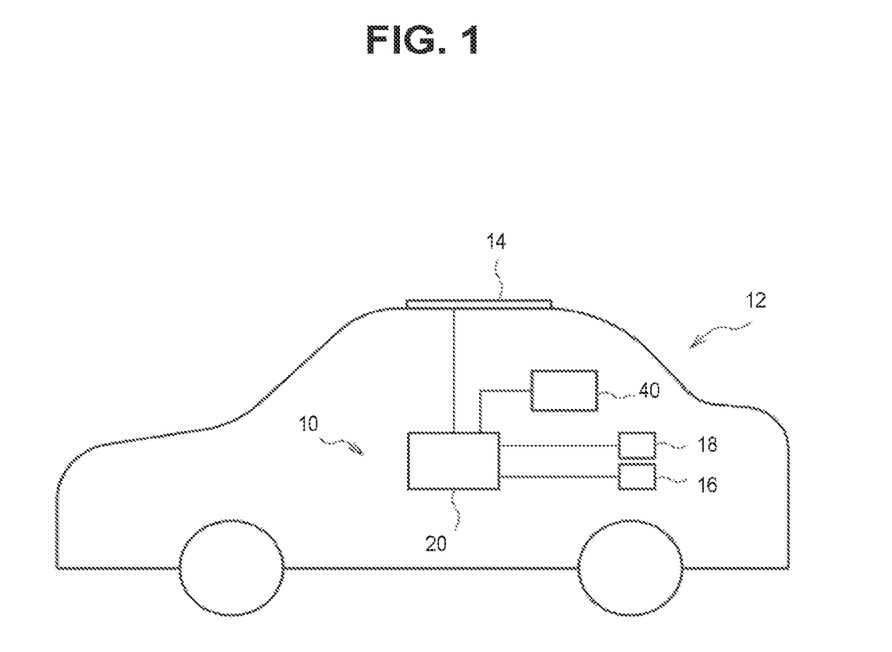
FIG. 1 is a schematic view of a vehicle equipped with an in-vehicle solar charge control system according to an embodiment.
Figure 2:
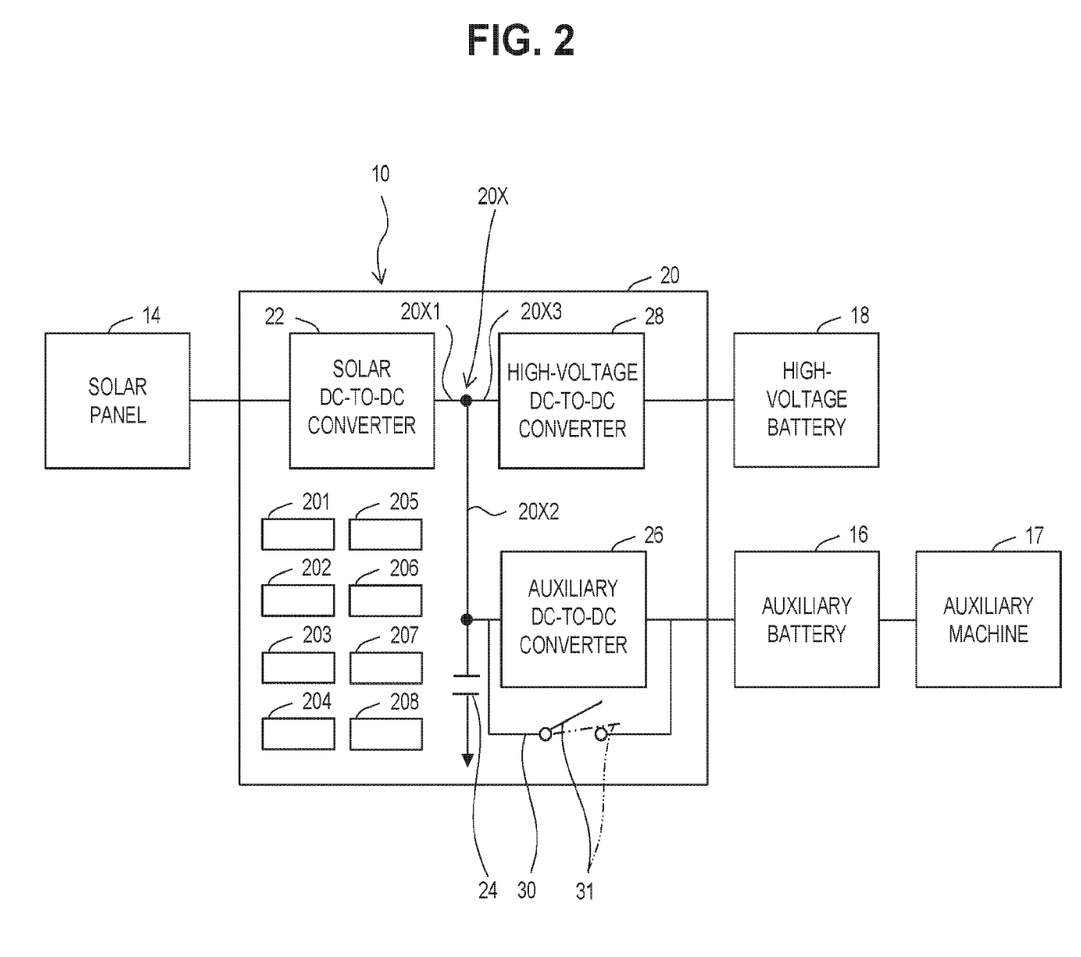
FIG. 2 is an overall view of the in-vehicle solar charge control system shown in FIG. 1.

As shown in FIGS. 1 and 2, the system 10 is mounted on a vehicle 12. The system 10 includes a solar panel 14, an auxiliary battery (first battery) 16, an auxiliary machine 17, a high-voltage battery (second battery) 18, driving devices, a solar electronic control unit (ECU) 20, and a battery ECU 40.

The solar panel 14 mounted on a roof of the vehicle 12 is a power generation device that generates power by receiving sunlight. The solar panel 14 is a solar cell module which is an assembly of lots of solar cells. A power generation amount (kWh), an amount of power generated by the solar panel 14, and an output voltage have at least a correlation with an amount of solar radiation. The power generated by the solar panel 14 is output to the solar ECU 20 (solar DC-to-DC converter 22). The maximum output voltage of the solar panel 14 of the present embodiment is about 60 V.

The auxiliary battery 16 is a rechargeable secondary battery, for example, a lithium-ion battery or a lead storage battery. When the power generated by the solar panel 14 is supplied to the auxiliary battery 16 via the solar ECU 20, the power is charged (stored) in the auxiliary battery 16. The auxiliary battery 16 is connected to at least one auxiliary machine 17 provided in the vehicle 12. These auxiliary machines 17 include, for example, a headlamp, an in-vehicle lamp, and an air conditioner. Each auxiliary machine 17 operates by receiving power supplied from the auxiliary battery 16. The rated voltage of the auxiliary battery 16 of the present embodiment is, for example, 13 V.

The high-voltage battery 18 is a rechargeable secondary battery, for example, a lithium-ion battery or a nickel-metal hydride battery. When the power generated by the solar panel 14 is supplied to the high-voltage battery 18 via the solar ECU 20, the power is charged (stored) in the high-voltage battery 18. The high-voltage battery 18 is connected to various driving devices provided in the vehicle 12. These driving devices include, for example, a starter motor and an electric motor as drive sources for the vehicle. These devices operate by receiving power supplied from the high-voltage battery 18. The rated voltage of the high-voltage battery 18 of the present embodiment is higher than the maximum output voltage of the solar panel 14 (for example, 350 V).

Figure 3:
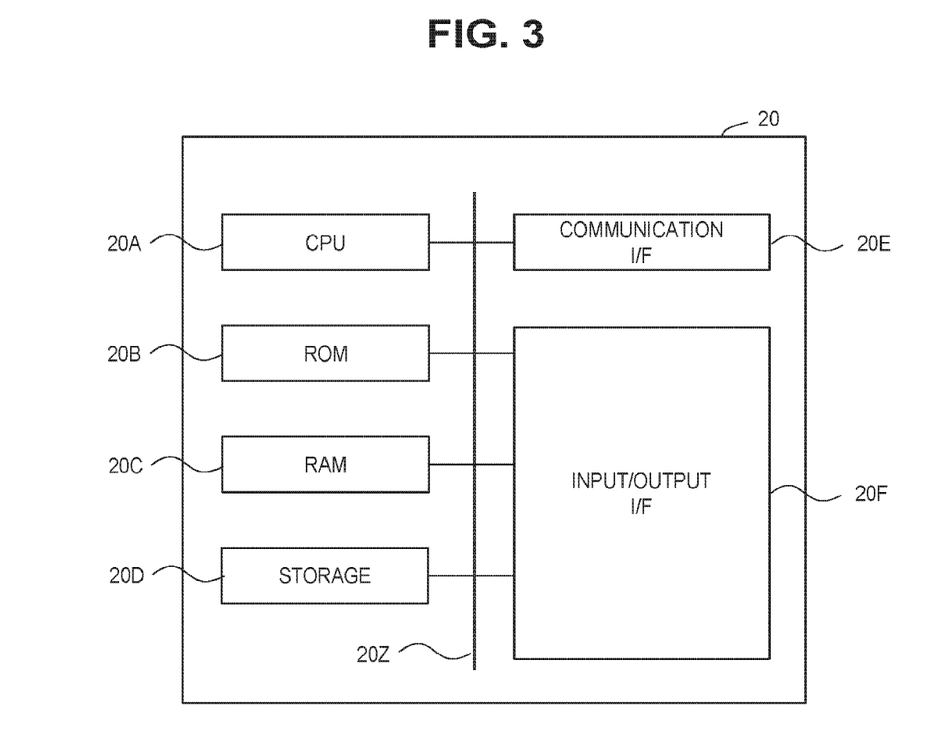
FIG. 3 is a control block diagram of a solar ECU shown in FIG. 2.

The solar ECU 20 connects the solar panel 14, the auxiliary battery 16, and the high-voltage battery 18. The solar ECU 20 can supply the power generated by the solar panel 14 to the auxiliary battery 16 and the high-voltage battery 18. As shown in FIG. 3, the solar ECU 20 is configured to include a central processing unit (CPU) 20A, a read only memory (ROM) 20B, a random access memory (RAM) 20C, a storage 20D, a communication interface (I/F) 20E, and an input/output I/F 20F. The CPU 20A, the ROM 20B, the RAM 20C, the storage 20D, the communication I/F 20E, and the input/output I/F 20F are connected to each other so as to establish communication therebetween via a bus 20Z. The solar ECU 20 can acquire information on a date and time from a timer (not shown).

The CPU 20A is a central processing unit that executes various programs and controls each unit. That is, the CPU 20A reads the program from the ROM 20B or the storage 20D and executes the program using the RAM 20C as a work area. The CPU 20A controls the components stated above and performs various arithmetic processes according to programs recorded in the ROM 20B or the storage 20D.

The ROM 20B stores various programs and various data. The RAM 20C temporarily stores a program or data as a work area. The storage 20D is configured by a storage device such as a hard disk drive (HDD) or a solid state drive (SSD), which stores various programs and various data. The communication I/F 20E is an interface for the solar ECU 20 to communicate with other devices. The input/output I/F 20F is an interface for communicating with various devices. For example, the solar panel 14 may be connected to the input/output I/F 20F.

FIG. 2 shows one example of a functional configuration of the solar ECU 20 in a block diagram. The solar ECU 20 has, as a functional configuration, an electric energy acquisition unit 201, a comparison unit 202, a solar DC-to-DC converter control unit 203, a first converter control unit (converter control unit) 204, a second converter control unit (converter control unit) 205, a switch control unit (switching unit controller) 206, a vehicle state determination unit 207, and a solar panel control unit 208. The electric energy acquisition unit 201, the comparison unit 202, the solar DC-to-DC converter control unit 203, the first converter control unit 204, the second converter control unit 205, the switch control unit 206, the vehicle state determination unit 207, and the solar panel control unit 208 are implemented by the CPU 20A reading the program stored in the ROM 20B and executing it. The solar DC-to-DC converter control unit 203 controls a solar DC-to-DC converter 22, the first converter control unit 204 controls an auxiliary DC-to-DC converter (first DC-to-DC converter) 26, the second converter control unit 205 controls a high-voltage DC-to-DC converter (second DC-to-DC converter) 28, and the switch control unit 206 controls a bypass circuit (path switching unit) 30.

As shown in FIG. 2, the solar ECU 20 includes the solar DC-to-DC converter 22, a capacitor 24, the auxiliary DC-to-DC converter 26, the high-voltage DC-to-DC converter 28, and the bypass circuit 30. The solar ECU 20 has an electrical circuit 20X. The electrical circuit 20X has a first wiring 20X1 connected to the solar DC-to-DC converter 22, as well as a second wiring 20X2 and a third wiring 20X3 branching from the first wiring 20X1. In the following description, the electric power output from the solar DC-to-DC converter 22 and flowing through the first wiring 20X1 is referred to as "output power Em".

The solar DC-to-DC converter 22 supplies the power generated by the solar panel 14 to the capacitor 24, the auxiliary DC-to-DC converter 26, the high-voltage DC-to-DC converter 28, and the bypass circuit 30, while executing MPPT (maximum power point tracking) control. The solar DC-to-DC converter 22 outputs the power input from the solar panel 14 by adjusting (boosting/dropping) its voltage to a predetermined voltage based on an instruction from the solar DC-to-DC converter control unit 203. The solar DC-to-DC converter 22 is a non-isolated DC-to-DC converter in which a primary side and a secondary side are not isolated. While the solar panel 14 is generating the power, the solar DC-to-DC converter 22 is always in operation. A slight power loss occurs in the solar DC-to-DC converter 22. Accordingly, electric energy Eme of the output power Em is slightly smaller than the electric energy of the power input from the solar panel 14 to the solar DC-to-DC converter 22. Similarly, power loss also occurs in the auxiliary DC-to-DC converter 26 and the high-voltage DC-to-DC converter 28.

The capacitor 24 can store the power generated by the solar panel 14 and subject to voltage conversion by the solar DC-to-DC converter 22. The capacitor 24 is provided between the second wiring 20X2 and a ground potential. When the power flowing through the second wiring 20X2 is supplied to the capacitor 24 in a state where a storage amount of the capacitor 24 is zero, the storage amount and the voltage of the capacitor 24 gradually increase. Further, when the storage amount of the capacitor 24 reaches a predetermined amount, an intermediate voltage Vm, which is a voltage of the first wiring 20X1, the second wiring 20X2, and the third wiring 20X3, is maintained at a predetermined level (about 25 V in the present embodiment).

The auxiliary DC-to-DC converter 26 is provided on the second wiring 20X2. While the solar panel 14 is generating the power, the auxiliary DC-to-DC converter 26 is switched, based on an instruction from the first converter control unit 204, between a first operating state in which the power input from the second wiring 20X2 is output to the auxiliary battery 16 with the voltage lowered, and a first stopped state in which the power is not output to the auxiliary battery 16. The auxiliary DC-to-DC converter 26 is a non-isolated DC-to-DC converter in which a primary side and a secondary side are not isolated.

The high-voltage DC-to-DC converter 28 is provided on the third wiring 20X3. While the solar panel 14 is generating the power, the high-voltage DC-to-DC converter 28 is switched, based on an instruction from the second converter control unit 205, between a second operating state in which the power input from the third wiring 20X3 is output with the voltage raised, and a second stopped state in which the power is not output. The high-voltage DC-to-DC converter 28 is an isolated DC-to-DC converter in which a primary side and a secondary side are isolated by a transformer. The isolated high-voltage DC-to-DC converter 28 using the transformer has a boost ratio (ratio of a primary side voltage and a secondary side voltage) at which efficiency is maximized and that is determined based on a turn ratio of the transformer (ratio of the number of turns of a primary-side coil and the number of turns of a secondary-side coil). In particular, when the boost ratio matches the number of turns of the transformer, the efficiency of the isolated high-voltage DC-to-DC converter 28 is maximized.

The bypass circuit 30 is provided in the second wiring 20X2 such that it is in parallel with the auxiliary DC-to-DC converter 26. The bypass circuit 30 has a switch 31 which is movable between an OFF position (refer to a solid line in FIG. 2) and an ON position (refer to a dotted line in FIG. 2). The switch 31 is, for example, a semiconductor relay. A position of the switch 31 is controlled by the switch control unit 206. When the switch 31 is in the OFF position, the power flowing through the electrical circuit 20X does not flow through the bypass circuit 30. On the other hand, when the switch 31 is in the ON position, the power flowing through the electrical circuit 20X is supplied to the auxiliary battery 16 via the bypass circuit 30. A state of the bypass circuit 30 when the switch 31 is in the ON position is referred to as a "first state", and a state of the bypass circuit 30 when the switch 31 is in the OFF position is referred to as a "second state". The bypass circuit 30 is initially in the first state.

The battery ECU 40 shown in FIG. 1 is connected to the auxiliary battery 16 and the high-voltage battery 18. The battery ECU 40 is configured to include a CPU, a ROM, a RAM, a storage, a communication I/F, and an input/output I/F. The CPU, the ROM, the RAM, the storage, the communication I/F, and the input/output I/F are connected to each other so as to establish communication therebetween via a bus. The battery ECU 40 can acquire information on a date and time from a timer (not shown).

Figure 4:
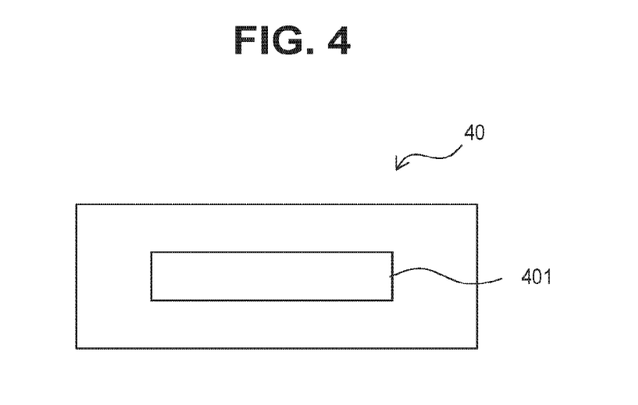
FIG. 4 is a functional block diagram of a battery ECU shown in FIG. 1.

FIG. 4 shows one example of a functional configuration of the battery ECU 40 in a block diagram. The battery ECU 40 has a power information acquisition unit (required electric energy acquisition unit) 401 as a functional configuration. The power information acquisition unit 401 is implemented by executing the program stored in the ROM by the CPU. The power information acquisition unit 401 of the battery ECU 40 can acquire current storage amount (SOC: state of charge), capacity, upper limit value of the storage amount, voltage, and temperature data of the auxiliary battery 16 and the high-voltage battery 18. The power information acquisition unit 401 calculates required electric energy Er (threshold) of the auxiliary battery 16 based on the information on SOC, capacity, upper limit value of the storage amount, voltage, and temperature data. When the auxiliary battery 16 is supplied with the power of the electric energy equal to or less than the required electric energy Er, the auxiliary battery 16 is not overcharged. Further, the solar ECU 20 and the battery ECU 40 are connected to each other via an in-vehicle network (not shown) such that data can be exchanged (communication is available). That is, the battery ECU 40 transmits, to the solar ECU 20, the information on SOC, capacity, upper limit value of the storage amount, voltage, and temperature data of the auxiliary battery 16 and the high-voltage battery 18, acquired by the power information acquisition unit 401, together with the information on the required electric energy Er of the auxiliary battery 16.

Operation and Effect

The operation and effect of the present embodiment will be described hereinbelow.

A flow of a process executed by the solar ECU 20 of the present embodiment will be described referring to the flowchart of FIG. 5. The solar ECU 20 repeatedly executes the process of the flowchart shown in FIG. 5 every time a predetermined time elapses.

In step S10, the electric energy acquisition unit 201 of the solar ECU 20 acquires the electric energy Eme of the output power Em flowing through the first wiring 20X1. Further, the comparison unit 202 determines whether or not the electric energy Eme acquired by the electric energy acquisition unit 201 is equal to or less than the required electric energy Er of the auxiliary battery 16, which is acquired by the power information acquisition unit 401 and transmitted to the solar ECU 20.

When it is determined as "YES" in step S10, the solar ECU 20 proceeds to step S11, the first converter control unit 204 switches the auxiliary DC-to-DC converter 26 to the first stopped state, and the second converter control unit 205 switches the high-voltage DC-to-DC converter 28 to the second stopped state.

The solar ECU 20 that has completed the process of step S11 proceeds to step S12, and the switch control unit 206 switches the bypass circuit 30 to the first state. Consequently, the voltage of the first wiring 20X1 and the second wiring 20X2, and the voltage of the capacitor 24 are equal to the voltage of the auxiliary battery 16 (for example, 13 V). Further, the output power Em is supplied to the auxiliary battery 16 via the first wiring 20X1, the second wiring 20X2, and the bypass circuit 30 (switch 31), and the power is stored in the auxiliary battery 16.

On the other hand, when it is determined as "NO" in step S10, the solar ECU 20 proceeds to step S13. In this case, surplus electric energy Esr, which is the electric energy obtained by subtracting the required electric energy Er of the auxiliary battery 16 from the electric energy Eme of the output power Em, is larger than zero.

The vehicle state determination unit 207 of the solar ECU 20 that has proceeded to step S13 determines whether or not the vehicle 12 is in the stopped state. For example, the vehicle state determination unit 207 determines whether or not the vehicle 12 is in the stopped state, based on at least one of information on a position of a shift lever (not shown) received from a shift position sensor (not shown) and information on a vehicle speed received from a vehicle speed sensor (not shown).

When it is determined as "YES" in step S13, the solar ECU 20 proceeds to step S14. When the solar ECU 20 proceeds to step S14, the first converter control unit 204 switches the auxiliary DC-to-DC converter 26 to the first operating state, and the second converter control unit 205 switches the high-voltage DC-to-DC converter 28 to the second operating state.

The solar ECU 20 that has completed the process of step S14 proceeds to step S15, and the switch control unit 206 switches the bypass circuit 30 to the second state. Consequently, the power having the intermediate voltage Vm maintained at about 25 V by the capacitor 24 is input from the second wiring 20X2 to the auxiliary DC-to-DC converter 26, and also input from the third wiring 20X3 to the high-voltage DC-to-DC converter 28.

The voltage of the power supplied from the second wiring 20X2 to the auxiliary DC-to-DC converter 26 is stepped down to about 13 V by the auxiliary DC-to-DC converter 26 and supplied to the auxiliary battery 16. The electric energy of the power supplied from the second wiring 20X2 to the auxiliary DC-to-DC converter 26 (auxiliary battery 16) is substantially the same as the required electric energy Er. Further, the power of the surplus electric energy Esr is supplied from the third wiring 20X3 to the high-voltage DC-to-DC converter 28.

When it is determined as "NO" in step S13, the solar ECU 20 proceeds to step S11.

Figure 5:
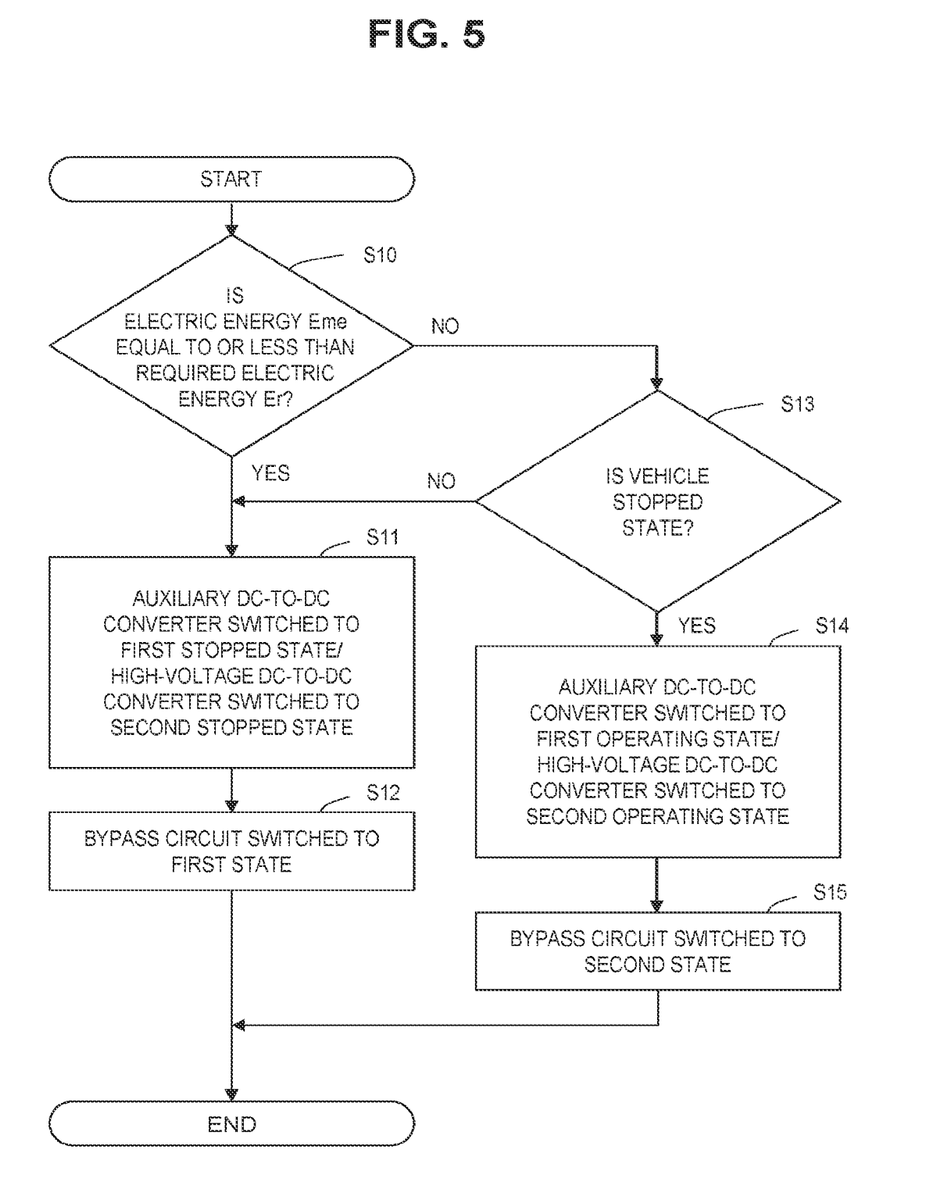
FIG. 5 is a flowchart illustrating a process executed by the solar ECU shown in FIG. 2.

When the process of step S12 or S15 is completed, the solar ECU 20 temporarily ends the process of the flowchart shown in FIG. 5.

As described above, in the system 10 of the present embodiment, when the electric energy Eme acquired by the electric energy acquisition unit 201 is equal to or less than the required electric energy Er of the auxiliary battery 16 (step S10: YES), the first converter control unit 204 switches the auxiliary DC-to-DC converter 26 to the first stopped state, the second converter control unit 205 switches the high-voltage DC-to-DC converter 28 to the second stopped state (step S11), and the switch control unit 206 switches the bypass circuit 30 (switch 31) to the first state (step S12). When the system 10 is in such a state, the power generated by the solar panel 14 (output power Em) is output from the solar DC-to-DC converter 22 and then supplied to the auxiliary battery 16 via the bypass circuit 30. In other words, the power (output power Em) generated by the solar panel 14 is output from the solar DC-to-DC converter 22 and then supplied to the auxiliary battery 16 not via the auxiliary DC-to-DC converter 26. Therefore, the system 10 is capable of achieving a configuration in which the two DC-to-DC converters (the solar DC-to-DC converter 22 and the auxiliary DC-to-DC converter 26) are disposed between the solar panel 14 and the auxiliary battery 16 while the power loss due to the DC-to-DC converters can be limited.

Further, when the system 10 is in such a state, the power of the electric energy equal to or less than the required electric energy Er is supplied to the auxiliary battery 16. When the auxiliary battery 16 is supplied with the power of the electric energy equal to or less than the required electric energy Er, the auxiliary battery 16 is not overcharged. Therefore, when the system 10 is in such a state, the auxiliary battery 16 is unlikely to deteriorate.

Further, when the system 10 is in such a state, the voltage of the output power Em output by the solar panel 14 varies according to a change in an amount of sunlight. Meanwhile, the voltage of the first wiring 20X1 and the second wiring 20X2, and the voltage of the capacitor 24 are kept at a value equal to the voltage of the auxiliary battery 16 (for example, 13 V). Therefore, the solar DC-to-DC converter 22 can easily execute MPPT control as compared with a case where the voltage of the first wiring 20X1 (and the voltage of the second wiring 20X2 and the capacitor 24) varies Further, in the system 10, when the electric energy Eme is larger than the required electric energy Er of the auxiliary battery 16 and the vehicle 12 is in the stopped state (step S10: NO, step S13: YES), the predetermined condition is satisfied. When this predetermined condition is satisfied, the first converter control unit 204 switches the auxiliary DC-to-DC converter 26 to the first operating state, the second converter control unit 205 switches the high-voltage DC-to-DC converter 28 to the second operating state (step S14), and the switch control unit 206 switches the bypass circuit 30 (switch 31) to the second state (step S15). Consequently, the high-voltage DC-to-DC converter 28 switched to the second operating state inputs the power of the surplus electric energy Esr, which is obtained by subtracting the required electric energy Er from the electric energy Eme of the output power Em, to the high-voltage battery 18. Therefore, a portion of the power generated by the solar panel 14 can be stored in the high-voltage battery 18. In this case, the auxiliary battery 16 is supplied with the amount of the electric energy equal to or less than the required electric energy Er, thus the auxiliary battery 16 is unlikely to deteriorate.

Further, in a case where the predetermined condition is not satisfied (step S10: YES or step S13: NO), the first converter control unit 204 switches the auxiliary DC-to-DC converter 26 to the first stopped state, the second converter control unit 205 switches the high-voltage DC-to-DC converter 28 to the second stopped state (step S11), and the switch control unit 206 switches the bypass circuit 30 (switch 31) to the first state (step S12). For example, the vehicle 12 is in the traveling state (step S13: NO), the power consumption of each auxiliary machine 17 supplied with the power from the auxiliary battery 16 is likely to be larger than when the vehicle 12 is in the stopped state. With this configuration, even if the power having electric energy exceeding the required electric energy Er is supplied to the auxiliary battery 16, it is unlikely that the auxiliary battery 16 is overcharged.

The system 10, the in-vehicle solar charge control method and the program according to the present embodiment have been described above, however the design of the system 10, the in-vehicle solar charge control method and the program can be appropriately modified to the extent that there is no deviation from the gist of the present disclosure.

For example, step S10 may be changed to a step of determining whether or not "the electric energy Eme of the output power Em is equal to or less than the predetermined value (threshold)". For example, when the amount of solar radiation is small, the electric energy Eme is equal to or less than the predetermined value. Consequently, for example, when the electric energy Eme of the output power Em is small because the amount of solar radiation is small, all the generated power is supplied to only one battery (auxiliary battery 16). Therefore, the auxiliary battery 16 can be efficiently charged by the power generated by the solar panel 14.

Figure 6:
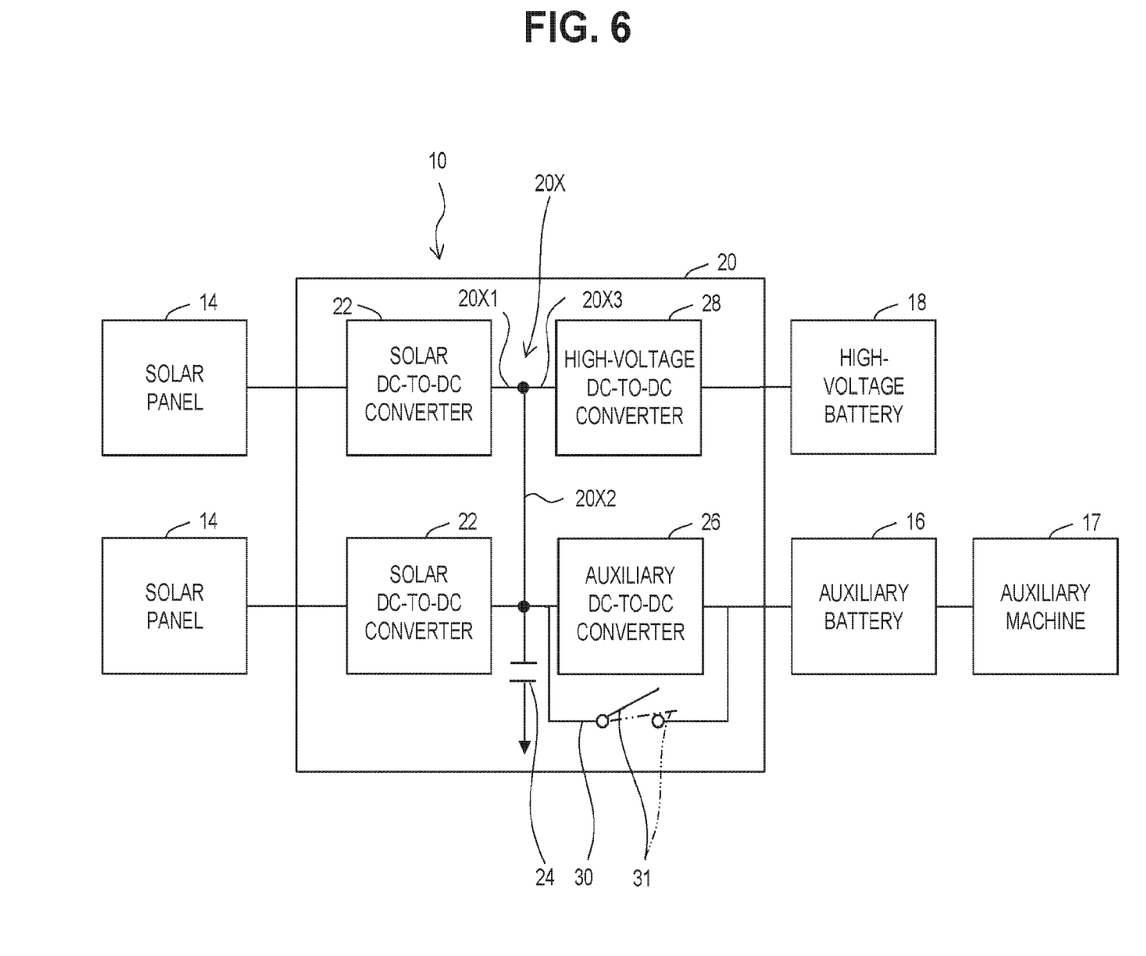
FIG. 6 is an overall view of an in-vehicle solar charge control system according to a modified example.

The present disclosure may be carried out in the embodiment of a modified example shown in FIG. 6. The system 10 of this modified example includes two solar panels 14 and two solar DC-to-DC converters 22. The power generated by one solar panel 14 is input to one solar DC-to-DC converter 22, and the power generated by the other solar panel 14 is input to the other solar DC-to-DC converter 22.

What is claimed is:

1. An in-vehicle solar charge control system comprising:
   a solar panel mounted on a vehicle;
   a solar DC-to-DC converter to which power generated by the solar panel is input;
   a first DC-to-DC converter to which output power output by the solar DC-to-DC converter is to be input;
   a converter control unit configured to switch the first DC-to-DC converter between a first operating state in which power is output while lowering a voltage when the output power is input, and a first stopped state in which power is not output;
   a first battery which is chargeable with power output by the first DC-to-DC converter in the first operating state;
   a path switching unit provided in parallel with the first DC-to-DC converter on an electrical circuit that connects the solar DC-to-DC converter and the first battery and through which electricity having the output power flows; and
   a switching unit controller configured to switch the path switching unit between a first state in which the output power is supplied to the first battery without being input to the first DC-to-DC converter, and a second state in which the output power is allowed to be input to the first DC-to-DC converter that is switched to the first operating state by the converter control unit.

2. The in-vehicle solar charge control system according to claim 1, further comprising:
   an electric energy acquisition unit configured to acquire electric energy of the output power,
   wherein the switching unit controller is configured to switch the path switching unit to the first state and the converter control unit is configured to switch the first DC-to-DC converter to the first stopped state, when the electric energy of the output power acquired by the electric energy acquisition unit is equal to or lower than a threshold.

3. The in-vehicle solar charge control system according to claim 2, further comprising:
   a required electric energy acquisition unit configured to acquire required electric energy of the first battery as the threshold; and
   a comparison unit configured to compare the electric energy of the output power acquired by the electric energy acquisition unit with the required electric energy acquired by the required electric energy acquisition unit, wherein:
   the first battery is not overcharged when power equal to or less than the required electric energy is supplied to the first battery; and
   the switching unit controller is configured to switch the path switching unit to the second state and the converter control unit is configured to switch the first DC-to-DC converter to the first operating state, when the comparison unit determines the electric energy of the output power is greater than the required electric energy.

4. The in-vehicle solar charge control system according to claim 3, further comprising:
   a second DC-to-DC converter to which the output power is to be input, the second DC-to-DC converter being switched by the converter control unit between a second operating state in which power is output while increasing a voltage when the output power is input, and a second stopped state in which power is not output;
   a second battery which is chargeable with power output by the second DC-to-DC converter in the second operating state; and
   at least one auxiliary machine configured to be supplied with power from the first battery,
   wherein the second DC-to-DC converter that is switched to the second operating state by the converter control unit is configured to, when a predetermined condition that the vehicle is stopped and a power generation amount of the output power is greater than the required electric energy is satisfied, output, to the second battery, power of surplus electric energy obtained by subtracting the required electric energy from the electric energy of the output power, and
   the converter control unit is configured to switch the first DC-to-DC converter to the first stopped state and the second DC-to-DC converter to the second stopped state and the switching unit controller is configured to switch the path switching unit to the first state, when the predetermined condition is not satisfied.

5. An in-vehicle solar charge control method executed by an in-vehicle solar charge control system, the in-vehicle solar charge control system including:
   a solar panel mounted on a vehicle;
   a solar DC-to-DC converter to which power generated by the solar panel is input;
   a first DC-to-DC converter which is switched between a first operating state in which power is output while lowering a voltage when output power generated by the solar DC-to-DC converter is input, and a first stopped state in which power is not output;
   a first battery which is chargeable with power output by the first DC-to-DC converter in the first operating state; and
   a path switching unit provided in parallel with the first DC-to-DC converter on an electrical circuit that connects the solar DC-to-DC converter and the first battery and through which electricity having the output power flows, the path switching unit being configured to switch between a first state in which the output power is supplied to the first battery without being input to the first DC-to-DC converter, and a second state in which the output power is allowed to be input to the first DC-to-DC converter in the first operating state, the in-vehicle solar charge control method comprising:

determining whether or not electric energy of the output power is equal to or lower than a threshold; and switching the path switching unit to the first state and switching the first DC-to-DC converter to the first stopped state, when the electric energy of the output power is equal to or lower than the threshold.

6. A program used for an in-vehicle solar charge control system, the in-vehicle solar charge control system including:

a solar panel mounted on a vehicle;

a solar DC-to-DC converter to which power generated by the solar panel is input;

a first DC-to-DC converter which is switched between a first operating state in which power is output while lowering a voltage when output power generated by the solar DC-to-DC converter is input and a first stopped state in which power is not output;

a first battery which is chargeable with power output by the first DC-to-DC converter in the first operating state; and a path switching unit provided in parallel with the first DC-to-DC converter on an electrical circuit that connects the solar DC-to-DC converter and the first battery and through which electricity having the output power flows, the path switching unit being configured to switch between a first state in which the output power is supplied to the first battery without being input to the first DC-to-DC converter, and a second state in which the output power is allowed to be input to the first DC-to-DC converter in the first operating state, the program causing the in-vehicle solar charge control system to execute:

determining whether or not electric energy of the output power is equal to or lower than a threshold; and switching the path switching unit to the first state and switching the first DC-to-DC converter to the first stopped state, when the electric energy of the output power is equal to or lower than the threshold.

* * * * *